(12) United States Patent
Hsu

(10) Patent No.: US 9,900,480 B1
(45) Date of Patent: Feb. 20, 2018

(54) COMBINATIONAL ELECTRONIC APPARATUS

(71) Applicant: Chao-Chih Hsu, New Taipei (TW)

(72) Inventor: Chao-Chih Hsu, New Taipei (TW)

( * ) Notice: Subject to any disclaimer, the term of this patent is extended or adjusted under 35 U.S.C. 154(b) by 0 days.

(21) Appl. No.: 15/343,671

(22) Filed: Nov. 4, 2016

(51) Int. Cl.
*H04N 5/225* (2006.01)

(52) U.S. Cl.
CPC ......... *H04N 5/2252* (2013.01); *H04N 5/2254* (2013.01)

(58) Field of Classification Search
CPC .............................. H04N 5/2252; H04N 5/254
See application file for complete search history.

(56) References Cited

U.S. PATENT DOCUMENTS

| | | | |
|---|---|---|---|
| 9,681,029 B2 * | 6/2017 | Harrison | .............. H04N 5/2252 |
| 2013/0143419 A1 | 6/2013 | Wei et al. | |
| 2015/0049243 A1 * | 2/2015 | Samuels | .............. G03B 17/568 |
| | | | 348/374 |
| 2017/0272626 A1 * | 9/2017 | Harrison | .............. H04N 5/2252 |

FOREIGN PATENT DOCUMENTS

GB    1345065 A    1/1974

* cited by examiner

*Primary Examiner* — Tuan Ho
(74) *Attorney, Agent, or Firm* — Shimokaji IP

(57) ABSTRACT

An electronic apparatus has a connection assembly and an electronic module. The connection assembly has a first connection portion. The first connection portion has a first connecting surface, a first buckle assembly, and a first magnetic attraction element. The first buckle assembly is disposed on the first connecting surface. The first magnetic attraction element is mounted in the first housing. The electronic module is detachably connected with the connection assembly and has a second connection portion. The second connection portion has a second connecting surface, a second buckle assembly, and a second magnetic attraction element. The second connecting surface selectively abuts the first connecting surface. The second buckle assembly is disposed on the second connecting surface and is detachably engaged with the first buckle assembly. The second magnetic attraction element is mounted in the second housing.

16 Claims, 5 Drawing Sheets

COMBINATIONAL ELECTRONIC APPARATUS

BACKGROUND OF THE INVENTION

1. Field of the Invention

The present invention relates to an electronic apparatus, and more particularly to a combinational electronic apparatus that can be combined and detached easily to form signal connection conveniently without a signal wire.

2. Description of Related Arts

Electronic apparatuses are important tools in daily life. To improve the convenience of using electronic apparatuses, multiple different electronic apparatuses with different functions may be connected with each other. For example, a driving recorder may be connected with a global positioning system (GPS) to obtain the positioning data.

With reference to FIG. 6, a conventional driving recorder comprises a fixing base and a recorder. The fixing base has a GPS chip mounted in the fixing base. The fixing base comprises a fixing segment, a connecting segment, and a connection wire. The fixing segment is securely attached to a windscreen of a vehicle. The connecting segment is connected with the fixing segment and has a spherical end opposite the fixing segment. One end of the connection wire is inserted into the fixing segment and is electrically connected with the GPS chip.

The recorder is detachably connected with the fixing base and comprises a connecting member and multiple slots. The connecting member is detachably connected with the connecting segment of the fixing base. With the connection of the connecting member with the connecting segment, the recorder is connected with the fixing base. The slots are defined in the recorder, and the connection wire is inserted into one of the slots. Accordingly, the recorder is electrically connected with the fixing base to transmit electronic signal between each other. In addition, the slots may be connected with a power source and other electronic devices with wires.

To prevent the recorder from detaching from the fixing base due to the vibration while the vehicle is driving, the connection between the connecting member and the connecting segment must be secure. However, the secure connection causes the difficulty of detaching the recorder from the fixing base when the user wants to take the recorder out of the vehicle. In addition, to detach the recorder from the fixing base, the connection wire has to be detached from the fixing base and the recorder first. Therefore, the connection wire causes inconvenience of using the conventional driving recorder and the appearance of the conventional driving recorder not neat. Furthermore, the connection wire is easily bent, such that the signal transmission is badly influenced.

To overcome the shortcomings, the present invention tends to provide a combinational electronic apparatus to mitigate or obviate the aforementioned problems.

SUMMARY OF THE INVENTION

The main objective of the invention is to provide a combinational electronic apparatus that is easily combined and detached.

The electronic apparatus has a connection assembly and an electronic module. The connection assembly has a first housing and a first connection portion. The first connection portion is disposed on the first housing and has a first connecting surface having two sides, a first buckle assembly, and a first magnetic attraction element. The first buckle assembly is disposed on the sides of the first connecting surface. The first magnetic attraction element is mounted in the first housing at a position adjacent to the first connecting surface. The electronic module is detachably connected with the connection assembly and has a second housing and a second connection portion. The second connection portion is disposed on the second housing and has a second connecting surface, a second buckle assembly, and a second magnetic attraction element. The second connecting surface selectively abuts the first connecting surface and has two sides. The second buckle assembly is disposed on the sides of the second connecting surface and is detachably engaged with the first buckle assembly. The second magnetic attraction element is mounted in the second housing at a position that is magnetically attracted to the first magnetic attraction element.

Other objects, advantages and novel features of the invention will become more apparent from the following detailed description when taken in conjunction with the accompanying drawings.

DETAILED DESCRIPTION OF PREFERRED EMBODIMENT

Figure 1:
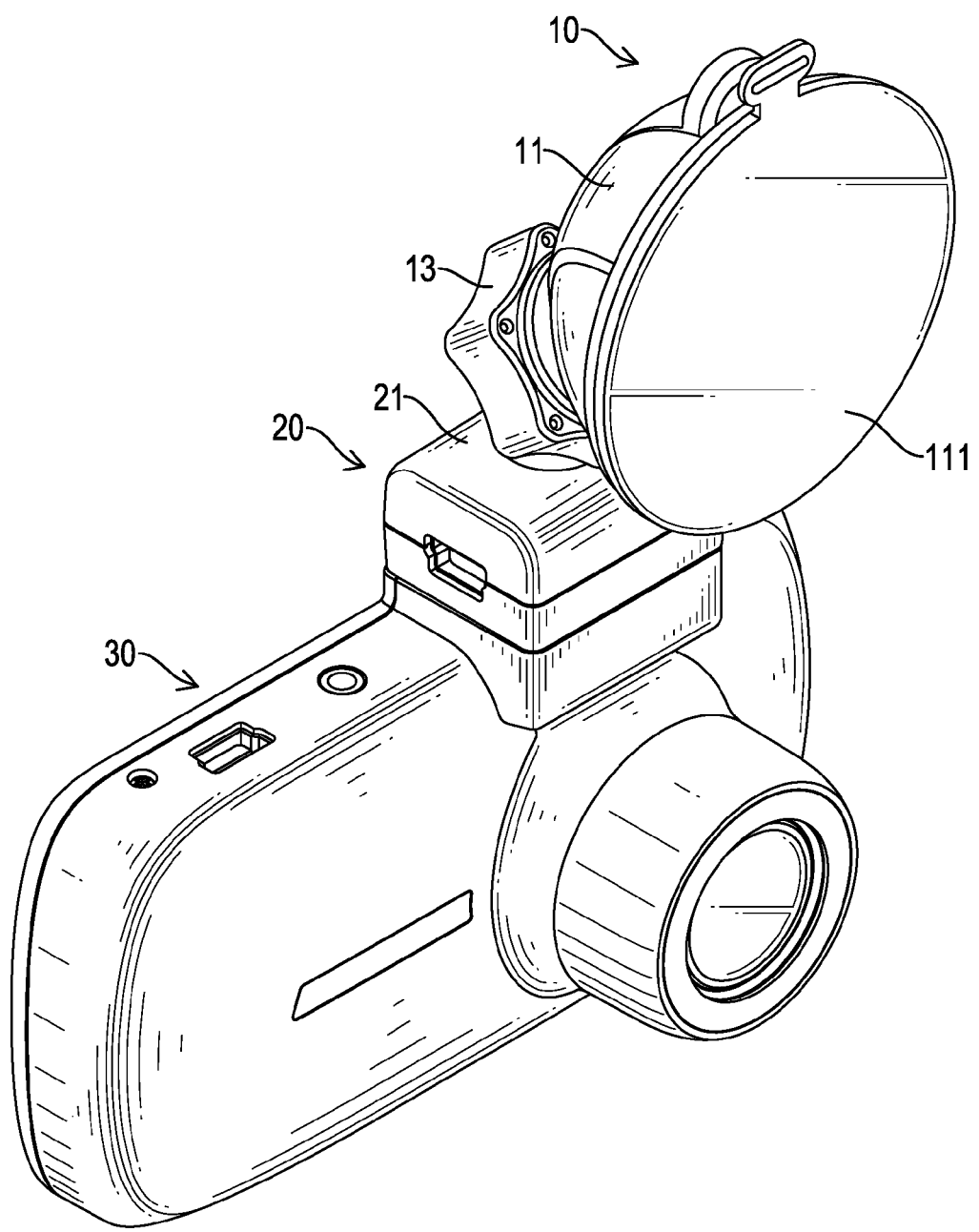
FIG. 1 is a perspective view of a combinational electronic apparatus in accordance with the present invention.
Figure 2:
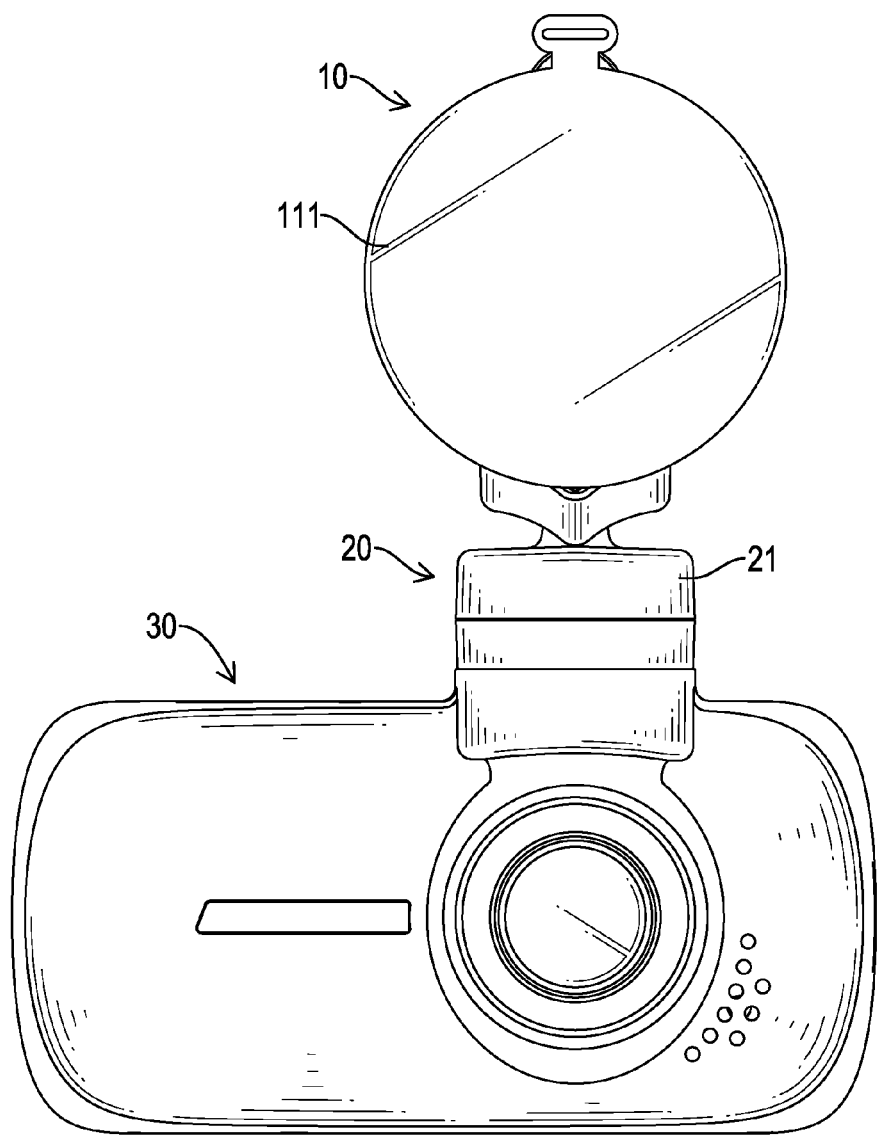
FIG. 2 is a front side view of the combinational electronic apparatus in partial section in FIG. 1.
Figure 3:
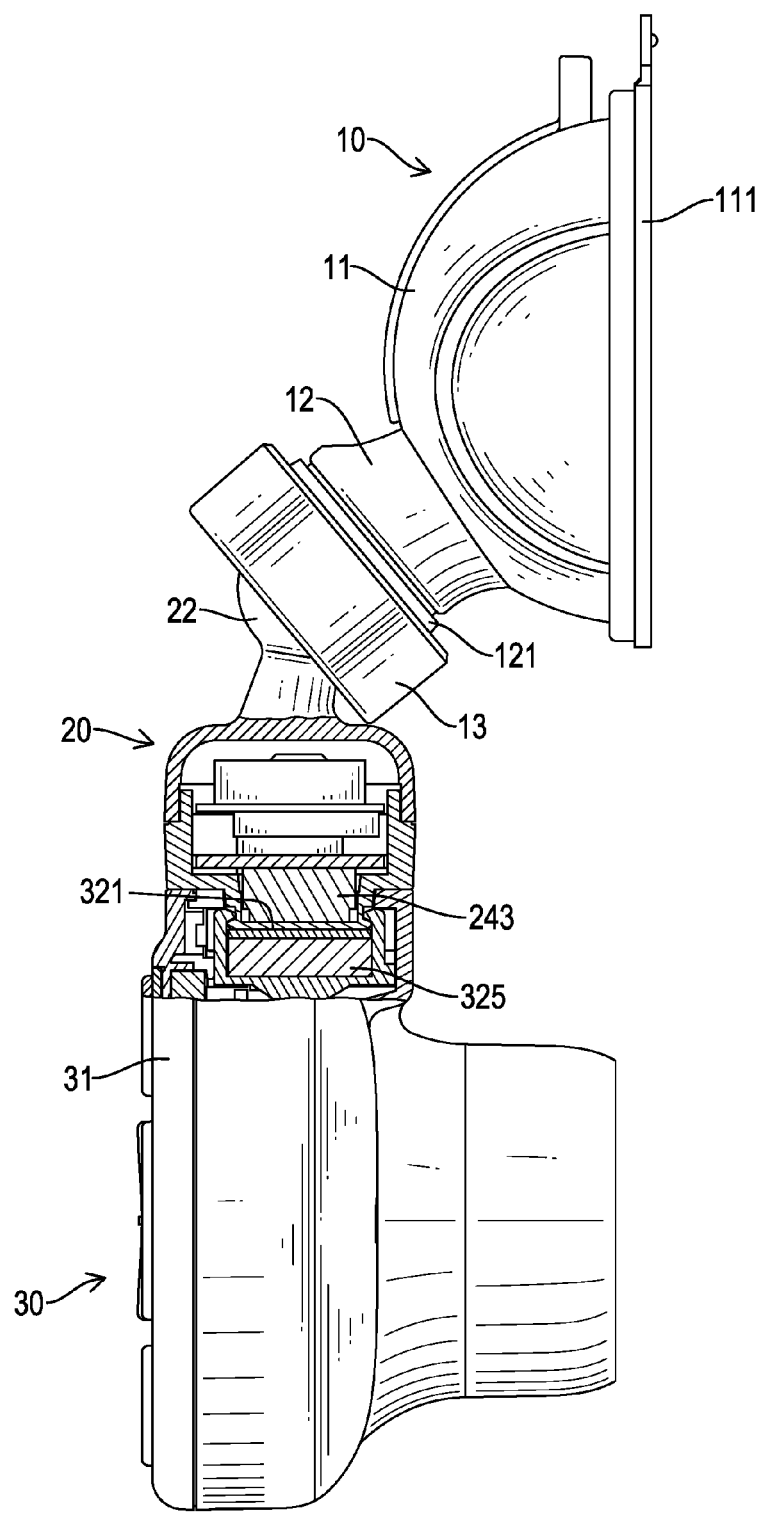
FIG. 3 is a side view in partial section of the combinational electronic apparatus in partial section in FIG. 1.
Figure 4:
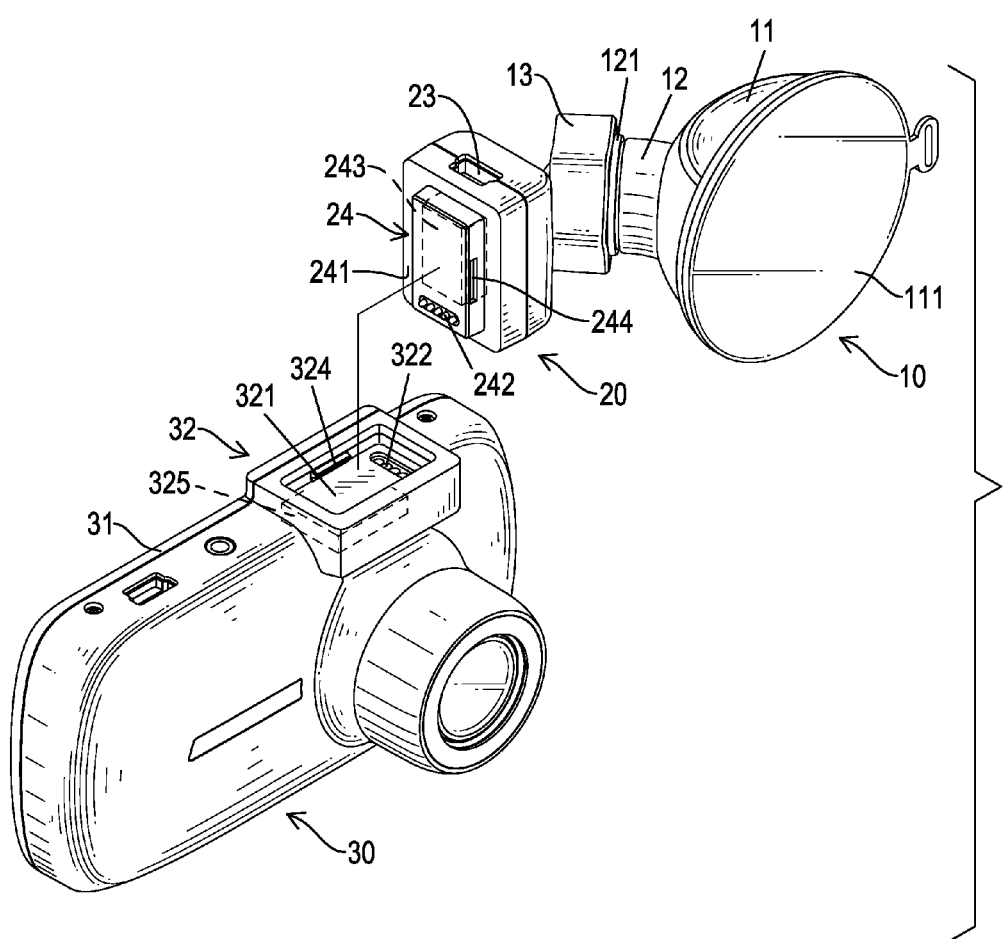
FIG. 4 is an exploded perspective view of the combinational electronic apparatus in partial section in FIG. 1.
Figure 5:
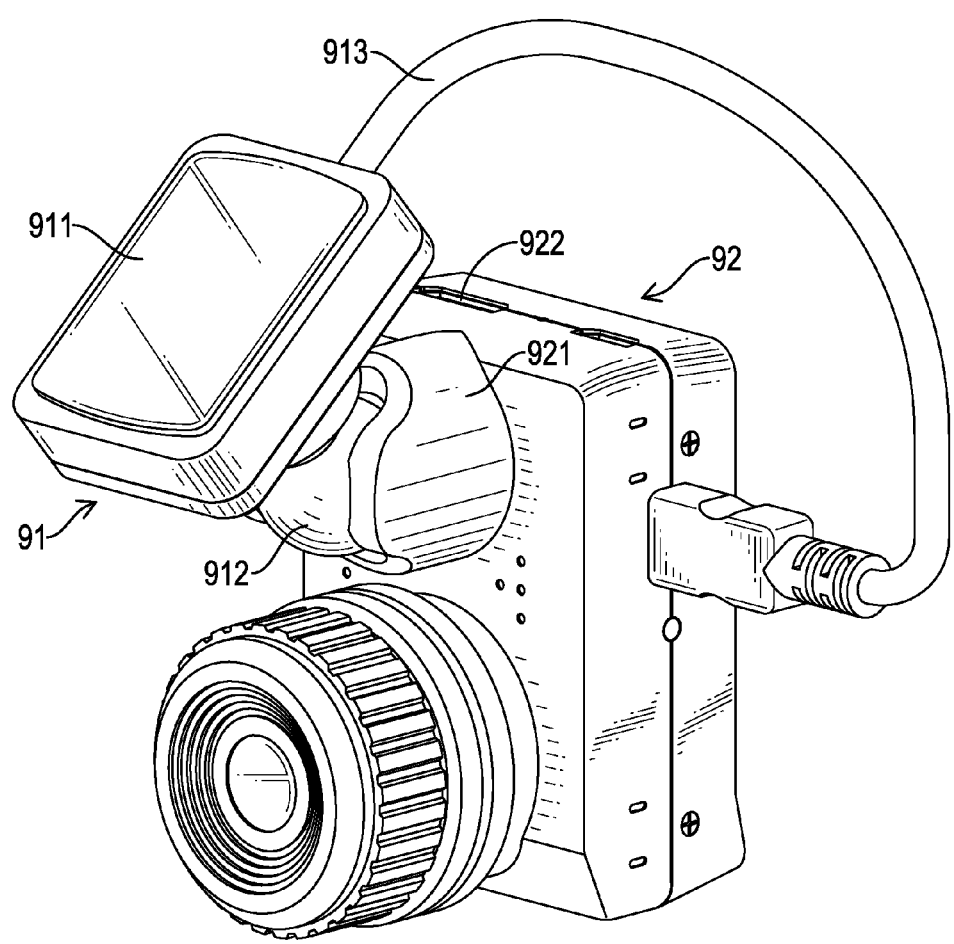
FIG. 5 is a perspective view of a conventional driving recorder.

With reference to FIGS. 1 to 4, a combinational electronic apparatus in accordance with the present invention comprises a connection assembly and an electronic module 30.

The connection assembly comprises a fixing base 10 and an electronic device 20. The fixing base 10 comprises a fixing segment 11, a connecting segment 12, and an angle-controlling ring 13. The fixing segment 11 can be securely attached to a flat surface. The connecting segment 12 is connected with the fixing segment 11 and can protrude from one end of the fixing segment 11. The connection segment 12 has an end opposite the fixing segment 11 and provided with an adjusting member 121. The adjusting member 121 has a thread formed on the outer surface of the adjusting member 121 and a concave space defined in the adjusting member 121. The angle-controlling ring 13 is mounted rotatably around the connecting segment 12. Preferably, the angle-controlling ring 13 is threaded with the thread on the adjusting member 121, and the concave space is formed between the adjusting member 121 and the angle-controlling ring 13.

The electronic device 20 is connected rotatably with the fixing base 10 and comprises a first housing 21, an extension member 22, a power slot 23, and a first connection portion 24. The electronic device 20 may have a global positioning system (GPS) arranged inside the electronic device 20.

The extension member 22 is formed on and protrudes from the first housing 21 and has a spherical end. The spherical end is rotatably mounted in the concave space in the adjusting member 121, and the extension member 22 is clamped between the adjusting member 121 and the angle-controlling ring 13. When the angle-controlling ring 13 is threaded tightly with the adjusting member 121, the concave space is reduced to prevent the extension member 22 from rotating relative to the fixing base 10. Accordingly, the angle between the electronic device 20 and the fixing base 10 is fixed. Thus, the angle between the electronic device 20 and the fixing base 10 can be adjusted after the angle-controlling ring 13 is unthreaded from the adjusting member 121.

The power slot 23 is defined in the first housing 21. Preferably, the power slot 23 is formed in a side of the first housing 21 adjacent to the extension member 22. Preferably, the power slot 23 may be a mini universal serial bus (USB).

The first connection portion 24 is disposed on the first housing 21. In the preferable embodiment, the first connection portion 24 comprises a protrusion formed on and protruding from the first housing 21. The first connection portion 24 has a first connecting surface 241, a first connector 242, a first buckle assembly 244, and a first magnetic attraction element 243. The first connecting surface 241 is formed on the electronic device 20 at a side opposite the extension member 22 and has two sides. The first connector 242 is disposed on the first connecting surface 241, is adjacent to an edge of the first connecting surface 241, and has a signal transmitting function. Preferably, the first connector 242 comprises multiple transmission needles. The first buckle assembly 244 is disposed on the sides of the first connecting surface 241. Preferably, the first buckle assembly 244 comprises two engaging recesses defined in the two sides of the first connecting surface 241. The first magnetic attraction element 243 is mounted in the first housing 21 at a position adjacent to the first connecting surface 241.

The electronic module 30 is detachably connected with the connection assembly and may be a driving recorder that has a video lens for recording motion pictures and a memory for storing the motion pictures. The electronic module 30 comprises a second housing 31 and a second connection portion 32.

The second housing 31 is formed as the outer casing of the electronic module 30. The second connection portion 32 is disposed on the second housing 31. Preferably, the second connection portion 32 comprises a cavity formed in the second housing 31 and holding the protrusion of the first connection portion 24 inside. The second connection portion 32 has a second connecting surface 321, a second connector 322, a second buckle assembly 324, and a second magnetic attraction element 325. The second connecting surface 321 is formed on a bottom of the cavity, selectively abuts the first connecting surface 241, and has two sides. The second connector 322 is mounted on the second connecting surface 321 and is detachably connected electrically with the first connector 242. In the preferred embodiment, with the electrical connection between the connectors 242,322, the signal of the GPS can be sent to the driving recorder to identify the locations of the motion pictures.

The second buckle assembly 324 is mounted on the sides of the second connecting surface 321 and is detachably engaged with the first buckle assembly 244. Preferably, the second buckle assembly 324 comprises two resilient engaging tabs formed on the two sides of the second connecting surface 321 and selectively engaged with the two engaging recesses of the first buckle assembly 244. The second magnetic attraction element 325 is mounted in the second housing 31 at a position that is magnetically attracted to the first magnetic attraction element 243.

In use, the fixing base 10 is securely attached to a flat surface, such as a windscreen of a vehicle. The electronic module 30 is attached to the electronic device 20 along a direction perpendicular to the first connecting surface 241 or the second connecting surface 321. Consequently, the two resilient engaging tabs of the second buckle assembly 324 are engaged with the two engaging recesses of the first buckle assembly 244. At the same time, the second connector 322 is connected with the first connector 242, such that the electronic module 30 is electrically and securely connected with the electronic device 20.

With the magnetic attraction force of the magnetic attraction elements 243,325, the combination between the electronic module 30 and the electronic device 20 is firm. The electronic module 30 is not detached from the electronic device 20 even when the vehicle is driving on a bumpy road.

To detach the electronic module 30 from the electronic device 20, the electronic module 30 is pushed downward. The resilient engaging tabs will be automatically disengaged from the engaging recesses with the resilience of the resilient engaging tabs. Therefore, the electronic module 30 and the connection assembly are easily and conveniently combined with or detached from each other. In addition, when the first buckle assembly 244 is engaged with the second buckle assembly 324, the first connector 242 will be electrically connected with the second connector 322 at the same time to transmit the electronic signal between each other. The electrical power in the electronic module 30 can be transmitted to the electronic device 20. Therefore, additional wires are unnecessary, so the appearance of the electronic apparatus is neat.

Alternatively, the first buckle assembly 244 may comprise two resilient engaging tabs and the second buckle assembly 324 may comprise two engaging recesses. This means that the resilient engaging tabs are formed on the electronic device 20 and the engaging recesses are defined in the electronic module 30. In addition, the first connection portion 24 may comprise a cavity and the second connection portion 32 may comprise a protrusion.

Furthermore, the connection assembly may only have the fixing base 10 or the electronic device 20. When the connection assembly only has the fixing base 10, the fixing base 10 has the first housing 21 and the first connecting surface 241, the first connector 242, the first buckle assembly 244, and the first magnetic attraction element 243 of the first connection portion 24 are disposed on the first housing 21 of the fixing base 10. Accordingly, the electronic module 30 can be securely attached to any desired location by the fixing base 10.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic apparatus comprising:
   a connection assembly having
   a first housing; and
   a first connection portion disposed on the first housing and having
   a first connecting surface having two sides;
   a first buckle assembly disposed on the sides of the first connecting surface; and a first magnetic attraction element mounted in the first housing at a position adjacent to the first connecting surface; and an electronic module detachably connected with the connection assembly and having
a second housing; and
a second connection portion disposed on the second housing and having
a second connecting surface selectively abutting the first connecting surface and having two sides;
a second buckle assembly disposed on the sides of the second connecting surface and detachably engaged with the first buckle assembly; and
a second magnetic attraction element mounted in the second housing at a position where is magnetically attracted to the first magnetic attraction element.

2. The electronic apparatus as claimed in claim 1, wherein
the first buckle assembly comprises two engaging recesses defined in the two sides of the first connecting surface; and
the second buckle assembly comprises two resilient engaging tabs formed on the two sides of the second connecting surface and selectively engaged with the two engaging recesses.

3. The electronic apparatus as claimed in claim 2, wherein
the first connection portion comprises a protrusion formed on and protruding from the first housing; and
the second connection portion comprises a cavity formed in the second housing and holding the protrusion of the first connection portion inside.

4. The electronic apparatus as claimed in claim 3, wherein the connection assembly comprises a fixing base and an electronic device connected with the fixing base;
the first housing and the first connection portion are disposed on the electronic device;
the first connection portion further comprises a first connector mounted on the first connecting surface; and
the second connection portion further comprises a second connector mounted on the second connecting surface and detachably connected electrically with the first connector.

5. The electronic apparatus as claimed in claim 4, wherein the fixing base comprises
a fixing segment;
a connecting segment connected with the fixing segment and connected rotatably with the electronic device; and
an angle-controlling ring mounted rotatably around the connecting segment.

6. The electronic apparatus as claimed in claim 1, wherein
the first connection portion comprises a protrusion formed on and protruding from the first housing; and
the second connection portion comprises a cavity formed in the second housing and holding the protrusion of the first connection portion inside.

7. The electronic apparatus as claimed in claim 6, wherein the connection assembly comprises a fixing base and an electronic device connected with the fixing base;
the first housing and the first connection portion are disposed on the electronic device;
the first connection portion further comprises a first connector mounted on the first connecting surface; and
the second connection portion further comprises a second connector mounted on the second connecting surface and detachably connected electrically with the first connector.

8. The electronic apparatus as claimed in claim 7, wherein the fixing base comprises
a fixing segment;
a connecting segment connected with the fixing segment and connected rotatably with the electronic device; and
an angle-controlling ring mounted rotatably around the connecting segment.

9. The electronic apparatus as claimed in claim 2, wherein the connection assembly comprises a fixing base and an electronic device connected with the fixing base;
the first housing and the first connection portion are disposed on the electronic device;
the first connection portion further comprises a first connector mounted on the first connecting surface; and
the second connection portion further comprises a second connector mounted on the second connecting surface and detachably connected electrically with the first connector.

10. The electronic apparatus as claimed in claim 9, wherein the fixing base comprises
a fixing segment;
a connecting segment connected with the fixing segment and connected rotatably with the electronic device; and
an angle-controlling ring mounted rotatably around the connecting segment.

11. The electronic apparatus as claimed in claim 1, wherein the connection assembly comprises a fixing base and an electronic device connected with the fixing base;
the first housing and the first connection portion are disposed on the electronic device;
the first connection portion further comprises a first connector mounted on the first connecting surface; and
the second connection portion further comprises a second connector mounted on the second connecting surface and detachably connected electrically with the first connector.

12. The electronic apparatus as claimed in claim 11, wherein the fixing base comprises
a fixing segment;
a connecting segment connected with the fixing segment and connected rotatably with the electronic device; and
an angle-controlling ring mounted rotatably around the connecting segment.

13. The electronic apparatus as claimed in claim 2, wherein the connection assembly comprises a fixing base; and
the first housing and the first connection portion are disposed on the fixing base.

14. The electronic apparatus as claimed in claim 13, wherein the fixing base comprises
a fixing segment;
a connecting segment connected with the fixing segment and connected rotatably with the electronic device; and
an angle-controlling ring mounted rotatably around the connecting segment.

15. The electronic apparatus as claimed in claim 1, wherein the connection assembly comprises a fixing base; and
the first housing and the first connection portion are disposed on the fixing base.

16. The electronic apparatus as claimed in claim 15, wherein the fixing base comprises
a fixing segment;
a connecting segment connected with the fixing segment and connected rotatably with the electronic device; and an angle-controlling ring mounted rotatably around the connecting segment.

* * * * *